United States Patent [19]

Levinson

[11] 4,390,555  
[45] Jun. 28, 1983

[54] MICROWAVE OVEN COOKING METHOD

[76] Inventor: Melvin L. Levinson, 1 Meinzer St., Avenel, N.J. 07001

[21] Appl. No.: 173,006

[22] Filed: Jul. 28, 1980

Related U.S. Application Data

[63] Continuation-in-part of Ser. No. 129,360, Mar. 11, 1980, which is a continuation-in-part of Ser. No. 4,324, Jan. 17, 1979, abandoned, which is a continuation-in-part of Ser. No. 927,397, Jul. 24, 1978, abandoned, which is a continuation-in-part of Ser. No. 713,235, Aug. 10, 1976, Pat. No. 4,103,431.

[51] Int. Cl.³ .................. A23L 1/00; B65B 29/00; B65B 29/08
[52] U.S. Cl. .................. 426/234; 219/10.55 M; 426/241; 426/243; 426/302
[58] Field of Search ............... 426/234, 241, 242, 243, 426/107, 113; 219/10.55 E, 10.55 M

[56] References Cited

U.S. PATENT DOCUMENTS

| | | | |
|---|---|---|---|
| 3,256,101 | 6/1966 | Arns | 426/241 |
| 3,322,319 | 5/1967 | Sweeney et al. | 426/113 |
| 3,556,817 | 1/1971 | Jeppson | 426/241 |
| 3,597,228 | 8/1971 | Jeppson et al. | 426/243 |
| 3,906,115 | 9/1975 | Jeppson | 426/241 |
| 3,928,045 | 12/1975 | Tsunoda et al. | 426/113 |
| 3,972,277 | 8/1976 | Tamano | 426/241 |
| 3,985,990 | 10/1976 | Levinson | 426/243 |
| 3,985,991 | 10/1976 | Levinson | 426/243 |
| 4,027,132 | 5/1977 | Levinson | 426/243 |
| 4,054,672 | 10/1977 | Inove | 426/419 |
| 4,154,861 | 5/1979 | Smith | 426/243 |

OTHER PUBLICATIONS

Produce Marketing, 11/61.

Primary Examiner—Steven L. Weinstein

[57] ABSTRACT

The defrosting and subsequent heating, cooking and/or baking of a frozen convenience food, in a microwave oven, is enhanced by surface-defrosting-wetting the surface of said frozen food with water to cause a positive surface-to-core differential in microwave lossiness in said food prior to exposing said surface-defrosted food to microwave radiation. Described is the step of blotting and/or draining off excess water after wetting and prior said exposure to microwave radiation. Described is adding replacement frying oil to microwave-heated fried convenience food. Also, described is the combination of the methods of this invention with the methods and apparatus described in U.S. Pat. Nos. 3,985,990 and 3,985,991 and in copending application U.S. Ser. No. 129,360, filed Mar. 11, 1980. The harvest-freezing for later defrosting of certain foods is described.

4 Claims, 4 Drawing Figures

MICROWAVE OVEN COOKING METHOD

CROSS REFERENCE TO RELATED APPLICATIONS

This is a continuation-in-part application of copending application, U.S. Ser. No. 129,360, filed 3/11/80 which is a continuation-in-part of U.S. Ser. No. 4,324, filed 1/17/79, now abandoned, which is a continuation-in-part of U.S. Ser. No. 927,397, filed 7/24/78, now abandoned, which is a continuation-in-part of Ser. No. 713,235, filed Aug. 10, 1976, U.S. Pat. No. 4,103,431.

BACKGROUND OF THE INVENTION

1. Field of the Invention

Methods for defrosting and heating, cooking and/or baking of a frozen convenience food, in a microwave oven, are described. Representative frozen foods described are fried chicken, French fried potatoes, sweet potatoes, meat and fruit pies, egg rolls, TV dinners, entrees, meats and vegetables, citrus fruits, pizza pies, baked-and-leavened food products. This invention concerns improvements in the reconstituting frozen convenience foods both in microwave-permeable and/or microwave-non-permeable containers.

2. Description of Prior Art

Prior art systems teach apparatus and methods for defrosting and reconstituting a multicourse frozen convenience meal in a microwave oven (for example, my U.S. Pat. Nos. 3,985,990 and 3,985,991). Many prior art microwave oven defrosting and heating procedures have required either (1) microwave auxiliary heating elements (for example my U.S. Pat. Nos. 3,777,099 and 3,881,027), (2) microwave oven auxiliary gas or electric heating elements, (3) the defrost-preheating of a food in a microwave oven and its subsequent finish baking-browning in a separate gas or electric range, and (4) apparatus which sequentially defrost and heat by aggregating gas and electric apparatus with microwave oven apparatus (for example U.S. Pat. No. 3,972,277). These prior art systems all leave something to be desired, for example: (a) using two separate heating elements or ovens waste time, energy and are inconvenient; (b) individual characteristics of a few apple pies (e.g. non-homogeneous filling or internal temperature) out of many apple pies may on exposure to microwave energy spot and selectively heat; and (c) pies with a full crust, when exposed to microwave energy in paper containers did not bake or brown and when exposed, in an aluminum container, the bottom crust did not brown (re. my U.S. Pat. Nos. 3,985,990 and 4,027,132).

Prior art teaches how to "brown" food in a microwave oven by sprinkling chemicals on the surface of a food before exposing said food to microwave energy. This expedient gave the appearance of a browned food but not the taste.

A trained cook must prepare a particular food properly and must be prepared to vary his or her results to suit the individual idiosyncrasies of the person for whom said food is prepared. One person may want his or her meat cooked rare while others desire medium or well done portions. To achieve the versatility in microwave cooking that is expected of gas and electric cooking, a microwave oven cook must be supplied with as many different type and size cooking apparatus and procedures as a trained cook now requires in gas and electric cooking. Some apparatus and cooking procedures required by a microwave cook have no counterpart in gas and electric cooking, for example, the present innovation and apparatus designed just for microwave ovens as the high-temperature, perforated plastic film overlaying a liquid-and-fat absorptive material (more fully described in my U.S. Pat. No. 4,103,431 and my copending application U.S. Ser. No. 129,360, filed 3/11/80). Prior art microwave cooking procedures include selectively placing a charge of water (a) within a special cooking enclosure, (b) on one portion of a multiportion TV dinner, and (c) inside a particular type food as a baked and leavened product (more fully described in my aforementioned patents and copending applications).

What I have now discovered is the general utility of purposely surface-defrosting-wetting the surface of frozen food with water to create a positive surface-to-core differential in microwave lossiness in said food and then exposing said surface-defrosted wetted food to microwave energy. Further, I have discovered that this innovation enhances (a) the operation, reliability and repeatability of the apparatus described in my aforementioned patents and copending applications, (b) frozen convenience food packaged in aluminum trays, and (c) frozen convenience food packaged in ovenable board paperboard trays.

3. Summary of the Invention

In a microwave oven, it is an object of this invention:

1. to provide a method which will minimize the random spot-and-selective-heating and edge-heating associated with reconstituting a frozen food in a microwave oven while providing a selective heating of the surface of said food in relation to the inner substance of said food associated with gas and electric cooking.

2. to defrost and bake and/or heat to serving temperature frozen-convenience-food prebaked-and-leavened goods (as bagels, dinner rolls, and pancakes) and frozen-convenience-food unbaked-and-unleavened goods (as frozen unbaked turnovers and dumplings, meat and fruit pies);

3. to improve the operation of apparatus described in my copending application, U.S. Ser. No. 129,360, filed 3/11/80, and in my U.S. Pat. Nos. 3,985,990, 3,985,991, and 3,777,099; and 4. to freeze foods at their harvest and/or to make fit again, for subsequent human consumption, certain foods accidentally or purposely frozen whole as whole citrus fruits and whole baking potatoes.

DESCRIPTION OF PREFERRED EMBODIMENTS

Figure 1:
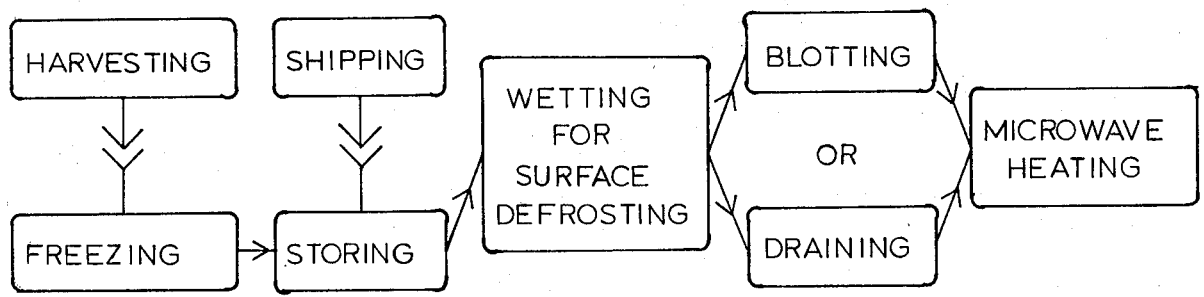
FIG. 1 is a flow chart of the method of the invention.

This invention is predicated on the fact that, subject to microwave radiation, water, in its liquid state, is many times more lossy than in its frozen state. A frozen food is many times less lossy than the lossiness of the identical food defrosted. Because of this natural state of things, frozen foods, exposed to microwave radiation, tend to spot defrost and, if said exposure continues, said defrosted spot undergoes thermal runaway. This spot heating taken with the inherent edge and deep heating of microwave heating have made it difficult to properly brown, bake and/or crust the surface of a food as well as properly reconstitute certain convenience frozen foods in microwave ovens.

I have discovered that the problem spot, selective and deep heating of microwave cooking, that differentiates microwave cooking from gas and electric cooking and which has made some people fault microwave cooking, can be circumvented and, the texture and surface cooked appearance of a food cooked in a gas or electric oven can be, for practical purposes, duplicated in microwave cooking. I have discovered that if, before exposing certain frozen foods to microwave energy, one first defrosts the surface of said frozen food with water and then (depending on the results desired) either partially or fully drains and/or blots excess water from the surface of said food before exposing said food to microwave energy, so that on exposure to microwave energy the defrosted surface and residual water on said surface will initially accept the preponderance of microwave energy irradiating said food and heat to boiling. While frozen, the core of said food, initially frozen, is relatively non-lossy in relation to said water and defrosted surface and said frozen core is only able to convert to heat, until it defrosts, a relatively small share of the initial microwave energy. In said immersion, the water can be either cold or hot and the immersion time either short or long depending on the results desired. I have discovered the utility of immersing a frozen food in water to create, prior to exposure to microwave energy, a positive surface-to-core differential in microwave lossiness in a food. I will employ the term, "surface-defrosting-wetting," to connote this process of actively surface-defrosting and surface-wetting a frozen food and then exposing said frozen food to microwave energy before the cold stored in the core of said frozen food can refreeze said water-defrosted and wet surface. This system differentiates over prior art systems which expose a food to gas and electric heating elements and subsequently expose said food to microwave energy, because my system teaches to timely, temporarily, combine water, added to the surface of a frozen food, with defrosted water immediately inside the surface of a frozen food so that said surface water (i.e. a material highly lossy to microwave energy) will act as a heating element for said frozen food. Water has special properties as a heating element. Water is innocuous, readily available, inexpensive and easy to apply and clean up.

Prior art teaches that certain foods can be defrosted by submerging said food in a pot or pan of water. In contrast, here is taught to temporarily defrost with water and then, after draining and/or blotting said water from said frozen food, to boil off the small residual quantities of water left on said food. Note it is expected that for frozen foods requiring browning or crusting, the added water mingled with the natural water in the surface of the food, on exposure to microwave energy, will rapidly boil off and leave the then dried, lossy surface of said food free to rise to browning and crusting temperatures. Before boiling off, surface water will, on heating, desirably spread heat laterally across the surface of said food. When the surface-wetting-defrosting of this invention is combined with heating in a closed container, water, evaporating from hot surfaces of a food and condensing on cold surfaces of said food, transfers heat energy from hot surfaces to cold surfaces by the latent heat of evaporation-condensation as is more fully described in my aforementioned patents. Once a cook understands the mechanics of my discovery, the desirable time of immersing said food in water (which takes into consideration the temperature of the water, the type and quantity of frozen food, the type of container, and the power level of the microwave oven) is developed empirically.

In my previous U.S. Pat. Nos. 3,985,990 and 3,985,991, I describe the utility of (a) placing a charge of water within a food heating enclosure remote from said food where on exposure to microwave radiation, said charge of water swiftly boils and its steam defrosts-heats the surface of a food while said steam blankets and heat-insulates said food, and (b) placing a charge of water directly on a particular type portion of a multi-portion frozen product to delay the time the wet portion reaches its final temperature to a time equal to the processing time of the other portions of said multiportion food product. Additionally, in my copending application I described adding a charge of water to the core of a baked and leavened product prior to freezing said product. My former teaching of adding a charge of water, either remote from or selectively on or in a food, is not negated by my present discovery, but it is expected that some will find utility in their combined application. For example, consider surface-defrosting-wetting the surface of a frozen bagel which, prior to freezing, had received a charge of water added to its core, on exposure to microwave energy, the lossy residual water on and the water in the defrosted crust evaporates off as the crust heats. The crust reaches a temperature higher than boiling before the center defrosts and starts to heat. The inner, added charge of water delays core heating while the bagel's surface has time to rise to crusting temperature and said added charge of water added to its core, on melting, keeps the bagel moister longer during a subsequent serving interval than would be the case if no charge of water was added to its core. The bagel's boiling-hot prebrowned crust, on cooling, evaporates off water to take on its baked consistency.

In my copending application, U.S. Ser. No. 129,360, filed 3/11/80, I described the utility of defrosting and heating a food on a perforated, high-temperature, non-lossy plastic film (as nylon 6 or polyester) which overlies a liquid and fat absorptive material (as paper toweling). The perforations were described as being of such size as (a) to permit the transfer of liquid by-products of a food which are in motion through said plastic film because of exposing said food to microwave energy and (b) to prevent the physical contact of said water with said absorptive material when said food is not exposed to microwave energy.

Figure 2:
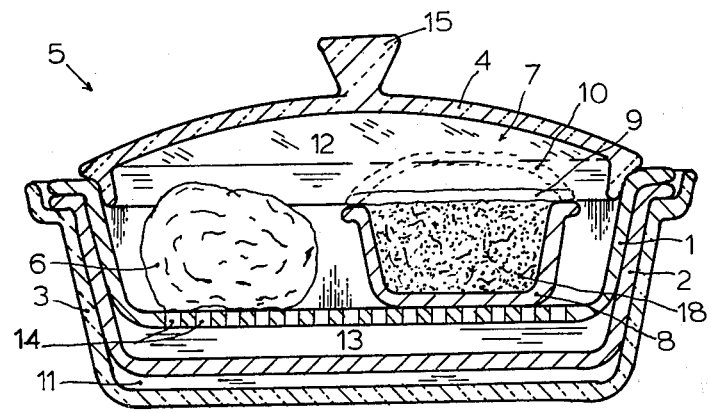
FIG. 2 is one embodiment of the microwave heating apparatus taught in my U.S. Pat. No. 3,985,990.

FIG. 2 illustrates one embodiment of a microwave heating utensil 5, further described in my U.S. Pat. No. 3,985,990, where a shallow, perforated, metal tray 1 is shown held by its periphery in a deep metal tray 2. The bottom of tray 1 and the top of tray 2 define a microwave-shielded, by-product collection chamber 13 therebetween. Tray 2 is held by its periphery in a deeper, microwave-non-lossy, heat-insulating tray 3. The bottom of tray 2 and the top of tray 3 define a heat-insulating chamber 11 therebetween. A transparent plastic (as clear polysulphone) or glass (as Pyrex) cover 4 (with handle 15) mates with tray 1 to define heating chamber 12 therebetween. Perforations 14—14 in the bottom of tray 1 permit the free passage of by-products and steam, evolved from heating a food in heating chamber 12, into condensation, collection chamber 13. Within chamber 12, there is illustrated a food 6 and, in its aluminum foil pie plate 8, a frozen convenience meat or fruit pie 7 resting directly on the bottom of tray 1. Pie 7 is illustrated having a filling 18 and a top crust 9 (which crust 9, on baking and leavening, rises to position 10).

In operation, a food 6, for example a frozen white or sweet baking potato, is first immersed in hot tap water to defrost and wet its surface. Whereupon, before its surface can refreeze from the cold stored in the mass of its core, food 6, said potato, is exposed to microwave energy in utensil 5 and "baked." The nutritious juices evolved from defrosting and "baking" that are collected in chamber 13 can, after "baking," be added back into the "baked" potato as one adds butter and/or sour cream.

In operation, if food 6 is, for example, frozen vegetables, said frozen vegetables are placed in tray 1 (while tray 1 is in tray 2) and tray 1 is filled with water to surface defrost and wet the surface of said vegetables. Next tray 1, with said vegetables in water, is removed from tray 2 and tray 1, acting as a colander, permits said vegetables to drain off excess water. Tray 2 is emptied of water. Tray 1, still holding said surface-defrosted-wetted vegetables, is returned to tray 2 and, when assembled as utensil 5, exposed to microwave energy. After defrosting and cooking, nutritious by-products, accumulated in chamber 13, can be either added back into the cooked vegetables or employed elsewhere as a nutritious drink or as a stock for a vegetable based soup. In further example, food 6 may be chestnuts. In operation the chestnuts are harvested, washed, split, frozen, and stored. Subsequently, said frozen chestnuts are removed from storage, surface-defrosted-wetted (e.g. using tray 1 as a colander in the same manner as described for vegetables) and then "roasted" in utensil 5 by exposing them to microwave energy.

The method by which my U.S. Pat. No. 3,985,990 operates includes the steps of (a) locating a food in proximity with at least one side of a microwave-reflective, heat-conductive body designed to partially shield a first portion of said food from microwave energy while said microwave energy heats a second portion of said food, (b) exposing said food to microwave energy to evaporate hot vapor from said second portion of said food, (c) collecting and condensing to liquid said hot vapor within a microwave shielded chamber thereby releasing said hot vapor's latent heat of vaporization, (d) conducting via said heat-conductive body said released heat to said first portion of said food, and (e) containing and shielding from further exposure to microwave energy said liquid.

Figure 3:
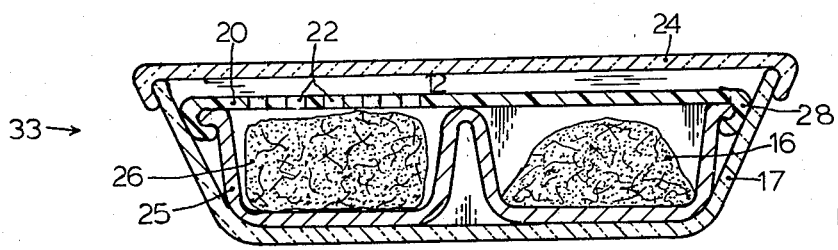
FIG. 3 is one embodiment of the microwave heating apparatus taught in my U.S. Pat. No. 3,985,991.

FIG. 3 illustrates one embodiment of the shipping-heating-eating container 33 described in my U.S. Pat. No. 3,985,991, where a multicourse, aluminum foil tray 25 is contained on the bottom of a water-absorptive tray 17. Illustrated in aluminum foil tray 25 are a first food portion 26 and a second food portion 16. Tray 25 and its contents are completely enclosed in a positive-vapor-pressure chamber 12 defined by tray 17 and cover 24. The method by which my U.S. Pat. No. 3,985,991 operates includes the steps of (a) locating a food in thermal contact with a microwave-shielded, heat-conductive container so that said container partially shields a first area of said food from direct exposure to microwave energy and leaves unshielded from microwave energy a second area of said food remote from said container, (b) enclosing said food and said container within an enclosure of microwave-permeable, heat-insulating material, and subsequently, (c) exposing to microwave energy said enclosure within said microwave oven until firstly said second area of said food absorbs and converts said microwave energy to heat energy and is heated, secondly said heated second area functions as a microwave-absorptive heating element and releases heat energy, thirdly said heat-insulating enclosure confines said released heat energy, and fourthly said first area is heated by said confined, released heat energy which is received and conducted to said first area by said heat-conductive container acting as a heat exchanger.

FIG. 3 apparatus improves over the apparatus described in my U.S. Pat. No. 3,985,991 in that a high-temperature plastic film 20 with perforations 22—22 is provided to secure foods 16 and 26 in tray 25 when tray 25 is inverted. Plastic film 20 can be a perforated semi-rigid plastic cover with molded snap-on-ends designed to mate with tray 25 in a manner well known. Film 20 is employed over a multicourse TV dinner to aid, after surface-defrosting-wetting of said TV dinner, in securing individual portions of said multicourse dinner in its tray on inversion of said tray for drainage. Film 20's colander function can be duplicated with the use of a temporary reusable utensil (not shown) designed to fill said function and be removed prior to heating without the exercise of invention. Film 20 can serve additional function, for example when food 16 is soup. If food 16 is soup, the particular portion of film 20 over said soup would not be perforated. Then during heating, said soup portion would be mechanically inhibited by film 20 from boiling out of its compartment. In operation, in chamber 12 defined by tray 17 covered by cover 24, food 16 and 26, contained in tray 25, are packaged and frozen. Prior heating in a microwave oven, tray 25 and contents would be removed from chamber 12. Tray 25 and contents are surface-defrosted-wetted, drained and then returned to tray 17, covered by cover 24 and exposed to microwave energy. It should be appreciated that alternate methods can be employed, for example, in their frozen state, individual portions of a multicourse meal can be easily, individually removed from tray 25, individually dipped in water, drained and returned to tray 25. Advantageously, when tray 25 and its contents are wetted as a unit, residual water remains on the outside of tray 25 which water, on exposure to microwave energy, hastens the start of the evaporation-condensation heating cycle more fully described in my U.S. Pat. No. 3,985,991.

Figure 4:
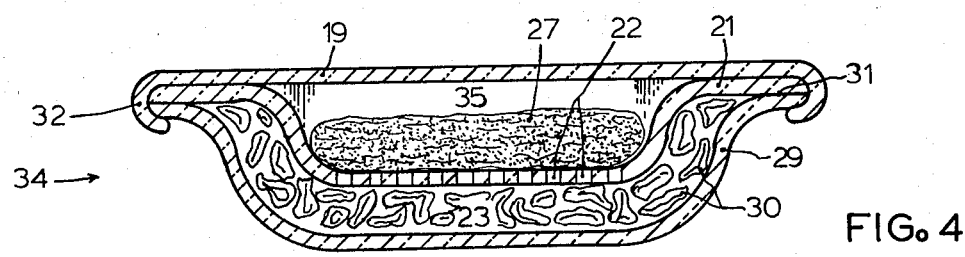
FIG. 4 is one embodiment of the microwave heating apparatus taught in my copending application, U.S. Ser. No. 129,360, filed 3/11/80.

FIG. 4 illustrates one embodiment of the apparatus 34 of my copending application, U.S. Ser. No. 129,360, filed 3/11/80, which comprises a microwave-non-lossy, water-and-fat absorptive material 30 as paper towling covered by a high-temperature, microwave-non-lossy, perforated plastic film 21 whose perforations 22—22 permit water and fat (in motion due and during an exposure of food 27 contained therein to microwave energy) to pass from its food receiving surface through plastic film 21 to be absorbed in material in collection chamber 23. Food 27, contained in film 21, absorptive material 30 and container 29, is covered by a high-temperature plastic cover 19. High-temperature plastic is preferred for cover 19 but, surprisingly, even though a pie crust may reach 350° F. beneath cover 19, a low temperature plastic as polystyrene, can be employed. The low-temperature plastic works because, although the pie crust reaches the hottest temperature, 350° F. plus, in the system, the steam-insulating blanket between said 350° F. crust and one side of cover 19 is not appreciably higher than 212° F. Since the other side of cover 19 is at room temperature, 70° F., it makes the center temperature of plastic cover 19 the average of 212° F. and 70° F. or 141° F. If any plastic utilized in this invention is permitted to physically contact a food which can reach browning temperatures, then said plastic must be a high-temperature plastic. Since plastic container 29 can be easily sealed 31, at its periphery, to a similar type plastic film, it is expected that some will market container 29, absorptive material 30 and film 21 as a disposable integral unit.

To permit the bottom of a food resting thereon to rise to crusting and browning temperatures, perforated film 21 and absorptive material 30 need only be disposed immediately beneath food 17, and they need not seal or extend to cover the total bottom and sides of container 29. Plastic cover can be formed to snap on and secure to container 29 in a manner well known. In operation, frozen food 27 is surface-defrosted-wetted, drained and/or blotted and then inserted into heating chamber 35 of apparatus 34.

With varying results, the same frozen food can be surface-defrosted-wetted and then cooked in the apparatus of FIGS. 2, 3 or 4 or in prior art covered glass, plastic or paper cooking utensils. If it is not desirable for a food to cook in a pool of its own by-products, than one should not use glass, paper or plastic containers and FIG. 3 apparatus as the results will be opposite of those desired. FIGS. 2 and 3 will provide a selectively heated food and FIG. 4 will provide the best uniformly heated food. FIGS. 2 and 3 are useful reconstituting frozen products packaged in aluminum foil trays. FIG. 4 is preferred for many frozen convenience foods as dinner rolls, bagels, fried chicken, pancakes, French toast, egg rolls, and French fried potatoes.

Ziploc Storage Bags, manufactured by Dow Chemical Co., are useful to store frozen food in a freezer. To practice this invention, one removes said bag and contents from the freezer, opens it and fills it with water to surface-defrost-wet frozen food contents. Then said bag is partially shut, inverted and drained. Whereupon it is sealed and its frozen food contents exposed to microwave energy therein. For simple defrosting, one can watch the bag and when it first expands from vapor generation, one terminates the microwave exposure and allows a predetermined resting period, opens the bag and partakes of the cool microwave defrosted food. Ziploc bags are not suitable for high temperature work as they melt.

Certain foods that should be fried, boiled and barbecued can be tastily, speedily and conveniently fried, boiled and barbecued in microwave apparatus more fully described in my U.S. Pat. Nos. 3,777,099. Notwithstanding, a cook can find it advantageous to practice the teachings of this invention in conjunction with said microwave frying, broiling, and barbecuing apparatus. For example, I have discovered that surprisingly a small frozen, convenience pizza pie can be usefully surface-defrosted-wetted before it is "fried" or "baked" in my U.S. Pat. No. 3,777,099 frying-baking microwave apparatus in a microwave oven. Certain unbaked and unleavened food products, as unbaked frozen rolls, turnovers, apple dumplings and the like, can be surface-defrosted-wetted before exposing them to the hot baking gases of microwave-ignited-charcoal in my U.S. Pat. No. 3,777,099 "microwave barbecue" apparatus.

It should be appreciated that the higher the power output of a microwave oven the more initial surface-to-core heat differential (e.g. browning and crusting) will be developed between a food's defrosted surface and its frozen core. Frozen foods in a 600 watt microwave oven generally take circa one minute per ounce of frozen food to reconstitute in a microwave oven with exceptions. Foods that take appreciably longer in a gas or electric oven, as baking potatoes and souffles, can take one-and-a-half to two minutes per ounce. FIG. 2 apparatus cooks faster that FIG. 4 apparatus because, for a like load, FIG. 4 apparatus expends power to evaporate by-product water. One way to estimate the cooking time per ounce a surface-defrosted-wetted frozen food will take to defrost and cook in a microwave oven—a method which considers ambient temperature, freezer temperature, microwave power level, etc.—is to surface-defrost-wet the surface of a frozen baking potato and expose said whole potato to microwave energy in a suitable heating container. In a 600 watt microwave oven, one-and-a-half minutes per ounce is a good place to start. In a series of tests, potatoes are weighed, wetted, and baked. Then they are sectioned and examined to determine if their texture is proper and all raw sections have been cooked. An alternate way is to monitor the smell of the cooking food. Pies smell well done. Potatoes stop emitting a raw cooking smell when done. A third way is, if the proper cooking time is known without surface-defrosting-wetting a product, it will take slightly longer per ounce if the product is surfae-defrosted wetted for the microwave generator must supply the energy required to deal with the added water. Standing time, after cooking, should be considered useful on occasions.

A further example of the operation of my discovery follows: In FIG. 2, a common, prefrozen, 8 ounce convenience pie 7 (packaged in aluminum pie plate 8 with meat or fruit filling 10 and top crust 9) is illustrated. Pie 7 is baked in utensil 5 until its top crust 9 bakes and rises to position 10 (said baking is further described in my U.S. Pat. No. 3,985,990). My present discovery of surface-defrosting-wetting pie crust 9 and/or whole pie 7 in its pie plate prior to exposing pie 7 to microwave energy in utensil 5 can result in a more uniformily baked top crust.

Before my U.S. Pat. No. 4,027,132, it was not believed possible to bake a pie with a full top and bottom crust in a microwave oven without the assistance of auxiliary gas, electric or microwave heating elements capable of producing 350°–450° F. baking temperatures. Surprisingly my discovery of surface-defrosting-wetting the surface of a frozen food, before exposing said food to microwave energy, makes possible the baking of frozen, convenience, unbaked pies with full top and bottom crusts (as well as related unbaked and unleavened goods as apple dumplings) in paper, plastic and glass containers. I discovered that, if one removes a frozen unbaked pie with a full top and bottom crust, from its aluminum foil pie plate and surface-defrosts-wets its crust and then—depending on its filling (e.g. meat or fruit type) and the color and texture of the finished crust desired—one drains and/or blots the crust, before exposing said pie to microwave energy, in apparatus 34, with practice, the results can compare to the results expected from gas and electric baking. With certain liquid type filling (e.g. liquid gravy in meat fillings) surface-defrosting-wetting of only the top crust should be considered. Apparatus 34, in FIG. 4, can be of such structure and shape as to simulate aluminum foil pie plate 8. But, in such case, (where apparatus 34 is shaped as a close-fitting paper pie plate) the pie filling, on baking, can rupture the top crust and boil out of apparatus 34 onto the microwave oven floor and there present a clean up problem. I prefer to place my pie in an apparatus 34 where the level of the unbaked top crust lies below (e.g. is saucered within) the top of container 29 so that, in the event the pie's filling boils and ruptures its crust, edible pie filling spill-over will be contained in apparatus 34. For pie baking, Keyes Fibre Company's Chi-Net material is useful for container 29 and cover 19. All bottom crusts do not bake successfully.

Domestic circa 600 watt microwave ovens are powerful enough to "bake" an eight ounce convenience pie. 400 watt can prove unsatisfactory as normal heat conduction within the pie can, at such low power level, counter the selective heating afforded by wetting. Similarly, one can expect unreliable results "baking" pies larger than eight ounces in 600 watt microwave ovens without auxiliary microwave heating elements. When manufacturers mass produce 2,000–5,000 watt variable power microwave ovens for the houseperson, power limitations on pie size will be eliminated.

Defrosting and "baking" a white frozen potato—without first surface-defrosting-wetting its surface—can result in a completely unsatisfactory finished product: (a) the potato may rupture or explode as pockets of liquid reach boiling temperatures trapped in rigid frozen sections, (b) the potato will spot heat, and (c) white fluid will ooze from the potato. A frozen sweet potato is not as critical to reconstitute in a microwave oven as is a white potato. In contrast to the results just recited, not practicing this invention, a frozen potato, surface-defrosted-wetted and "baked" as taught, is difficult to differentiate from a similar potato baked conventionally in a gas or electric oven from room temperature.

It is anticipated that once the value of this discovery is recognized, many fruits, particularly citrus fruits, that were, because of idiosyncrasies of weather, frozen immediately before harvest and considered damaged, no longer need be considered damaged and unsalable for human cosumption as said frozen fruit can be maintained frozen for ultimate defrosting to refrigerator temperatures (circa 37° F.) in a microwave oven. In fact, fruits and vegetables can be purposely left in the field and harvested during the first frost to extend their growing time to maximum. During a frost, nature adds the latent-heat-of-fusion required to freeze and, thereafter, man need only supply sufficient power to sustain the frozen state until it is desirable to defrost and partake of the harvest. Whether waiting until the first frost and then harvesting or harvesting and then leaving the crop in the field until after the first frost, said freezing a crop concurrent its harvest by natural means or just freezing the crop by refrigerating means arbitrarily has advantages. Frozen, fruits and vegetables are mechanically strong and not as susceptible to bruising. Frozen, fruits and vegetables are not as subject to damage from bacteria, molds, insects and other pests. Not frozen, fruits and vegetables are alive and even in cold storage they must breathe. Alive and unfrozen, fruits and vegetables give off quantities of heat so that refrigeration equipment must be employed to maintain cold storage. To sustain life, living fruits and vegetables must eat and excrete waste. Hence, in storage, living fruits and vegetables deteriorate—they consume and poison their own substance. Freezing a fruit or vegetable kills it. Dead and frozen it no longer eats, breathes and excretes waste. Frozen, in a practical sense, it no longer consumes itself, gives off heat, and changes in flavor.

It should be appreciated that many people find it desirable to consume certain foods as apples, bananas and the like from their fresh unfrozen state because, for an interval where it is considered "fresh food," turgor is maintained. Some people may find, certain frozen foods surface-defrosted-wetted, exposed to microwave energy and defrosted as taught, because of a loss of natural turgor, undesirable. On the other hand, for certain fruits as citrus fruits, the small loss of turgor, inherent in employing my discovery for fruit, may be translated into more tenderness and juiciness. Using my discovery, after extended frozen storage, a large fruit, as a whole orange, and small fruits, as berries, can be swiftly, uniformly defrosted in a microwave oven.

Residual frying-oil is washed off the surface of a frozen, deep-fat-fried food, when said food is exposed to microwave energy, because, when a food is exposed to microwave energy, liquid-by-products are forced out of the core of said food which action washes off residual frying oil from, at least, the top of said fried food. I have discovered the utility of replacing the residual frying-oil washed off the top surface of a microwave heated fried food. I prefer to spray replacement frying-oil, on at least, the top surface of a microwave heated fried food.

In operation, to accomplish surface-defrosting-wetting and/or replacement of washed-off frying oil, I prefer the use of two one-hand-operated, plastic pump spray bottles (not shown), or, in alternate, two spray atomizers (not shown). One spray bottle is filled with water and one spray bottle is filled with frying-oil. The spray bottle with water is useful for surface-defrosting-wetting certain frozen fried food before exposing said food to microwave energy. The spray bottle with frying oil is useful, after an exposure to microwave energy, to replace frying-oil washed-off a prefrozen fried food heated in a microwave oven. Sprayed frying-oil, on striking a microwave heated fried food, as French fried potatoes and fried chicken, appears to be absorbed into the surface of said hot fried food resulting in the appearance and taste of said fried food just removed from a deep fat frier. The operation, just described, of adding frying-oil to a microwave heated deep fat, fried food is opposite the operation of draining and blotting off of frying-oil from just deep-fat-fried food removed from a gas or electric deep fat frier.

The one-hand-operated, plastic, pump, water spray bottle (sic) is useful for surface-defrosting-wetting of frozen baked and leavened products before exposure of said food products to microwave energy. I prefer to lightly spray (e.g. surface-defrost-wet) just the upper surface of a frozen bread slice before defrosting in a microwave oven as the heating container on which the bread rests traps moisture on the bottom of said bread.

The utility, novelty, and operation of my discovery and how it improves and defines over prior art are illustrated in the following microwave heating of two frozen precooked meals:

Swanson, a Division of Campbell Soup Company, markets (packaged in ovenable paperboard trays) a "MAIN COURSE TURKEY WITH GRAVY DRESSING" and a "MAIN COURSE SALISBURY STEAK WITH GRAVY." Swanson's directions for said turkey main course follows: "To heat in a microwave oven *Do not remove film cover, *Place tray in microwave oven on high setting, *Heat six minutes,

*Raise film cover and separate meat, *Replace cover and heat an additional three minutes." Swanson's directions for said Salisbury steak main course follows: "To heat in a microwave oven *Do not remove film cover, *Place tray in microwave oven on high setting, *Heat four minutes, *Raise film cover and stir gray, *Replace cover, *Give tray ¼ turn, *Heat an additional four minutes or until hot."

To heat in a microwave oven according to the teachings of this invention both Swanson's Salisbury Steak and/or Turkey main courses proceed as follows: (a) remove frozen product from paper tray (discard tray or keep for subsequent serving of hot food), (b) surface-defrost-wet product with water, (c) place product meat side down (e.g. in contact with perforated aluminum tray) in my FIG. 2 apparatus, (d) expose to microwave energy, (e) serve in and partake of said hot food in said FIG. 2 apparatus. Note perforations 14—14 of said FIG. 2 apparatus should be of such position and size as to prevent gravy from falling into condensation chamber 13.

In contrast to the heating method taught by Swanson, heating in a microwave oven by the method here taught results in (a) a saving in time for a given internal temperature, (b) evenly heated food, (c) more attractive heated food, (d) gravy more concentrated and tasty, (d) no requirement to stir gravy mid way, (e) no requirement to stop mid way in cooking to rotate tray ¼ turn, (f) no requirement to stop mid way and physically separate meat, (g) the ability to heat two diverse foods separately simultaneously (or in one FIG. 2 apparatus which includes separate compartments for separate foods) conveniently.

Although this invention has been described with a certain degree or particularity, it should be understood that the present disclosure has been made only by way of example and that numerous changes in the details of construction and in the combination and arrangement of parts and in the methods described may be resorted to without departing from the spirit and scope of the invention.

I claim:

1. In a method of defrosting and heating in a microwave oven a frozen food, the steps which include:
   surface-defrosting-wetting said frozen food with water to create a positive surface-to-core differential in microwave lossiness in said food,
   enclosing said food in an inner, microwave-permeable member which contains a plurality of openings of sufficient size to permit the passage across said member of liquid-and-oil by-products of said food when evolved from said food due to exposing said food to microwave energy and of sufficient size to limit the passage across said member of said liquid-and-oil when said liquid-and-oil is not exposed to microwave energy,
   containing said food and said inner member in an outer microwave-permeable container fabricated to contain water and oil therein, and
   exposing said food to microwave radiation until said food defrosts and heats.

2. In a method of defrosting and heating in a microwave oven a frozen food, according to claim 1, the added step of:
   placing a water-and-oil-absorptive material between said inner member and said outer container.

3. In a method of defrosting and heating in a microwave oven a frozen food, according to claim 1, which includes:
   where said member is a high-temperature plastic perforated film.

4. In a method of defrosting and heating in a microwave oven a frozen food, according to claim 1, which includes:
   where said frozen food is a deep-fat-fried-and-then-frozen convenience food and where, after said exposure to microwave radiation, adding a predetermined amount of frying oil to the top surface of said fried food to replace the frying oil lost to said top surface during said exposure to microwave radiation.

* * * * *